United States Patent [19]

Nagano et al.

[11] Patent Number: 5,737,470
[45] Date of Patent: Apr. 7, 1998

[54] FLAT OPTICAL FIBER CABLE

[75] Inventors: Ryuichiro Nagano, Tokyo; Yoichi Nagase; Hajime Tamura, both of Gyoda, all of Japan

[73] Assignees: Nippon Telegraph and Telephone Corporation; Toyokuni Electric Cable Co., Ltd., both of Tokyo, Japan

[21] Appl. No.: 754,447

[22] Filed: Nov. 19, 1996

[51] Int. Cl.$^6$ .................................................. G02B 6/44
[52] U.S. Cl. ........................................................ 385/114
[58] Field of Search ................................. 385/100–114

[56] References Cited

U.S. PATENT DOCUMENTS

| | | | |
|---|---|---|---|
| 4,199,225 | 4/1980 | Slaugher et al. | 350/96.23 |
| 4,642,480 | 2/1987 | Hughes et al. | 307/147 |
| 4,815,814 | 3/1989 | Ulijasz | 350/96.23 |
| 5,253,318 | 10/1993 | Sayegh et al. | 385/114 |
| 5,524,166 | 6/1996 | Osaka et al. | 385/134 |

FOREIGN PATENT DOCUMENTS 63-200109  8/1988  Japan ........................... 385/114

*Primary Examiner*—John Ngo
*Attorney, Agent, or Firm*—Jordan and Hamburg

[57] ABSTRACT

At least an optical fiber of more than two pieces are arranged at least a tension member or more in a row, and the outside circumferential part of tension member and optical fiber is covered with a sheath so as to become a nearly oval shape. In addition, at least a torn slot or more is formed the outside circumferential part of a sheath. Therefore, it can be cut the end part of a sheath simply at the time of terminal management without the fact that an optical fiber makes damage and is added to power.

6 Claims, 18 Drawing Sheets

FLAT OPTICAL FIBER CABLE

BACKGROUND OF THE INVENTION

This invention relates to a flat optical fiber cable. Former flat optical fiber cable is composed of a tention member or more, more than two pieces of optical fibers, and a sheath. A tension member or more parallels to two pieces of optical fibers or more. The sheath covers the outside circumferential part of tension member and optical fibers so as to become an oval shape.

Although the above-mentioned flat optical fiber cable has been managed owing to cut off the sheath of an end part by a cutter knife and take out an inside tension member or optical fiber at the time of terminal management, there were faults that optical fiber was made to damage and added power to it when this sheath was cut off.

SUMMARY OF THE INVENTION

In view of the foregoing, it is an object of this invention to provide a flat optical fiber cable which can take away the sheath of an end part simply at the time of the terminal management without the fact that a flat optical fiber cable is made to damage and added to power.

The above and further objects and novel features of the invention will more fully appear from the following detailed description when the same is read in connection with the accompanying drawing. It is to be expressly understood, however, that the drawing is for the purpose of illustration only and is not intented as definition of the limits of the invention.

DESCRIPTION OF THE PREFERRED EMBODIMENT

Figure 1:
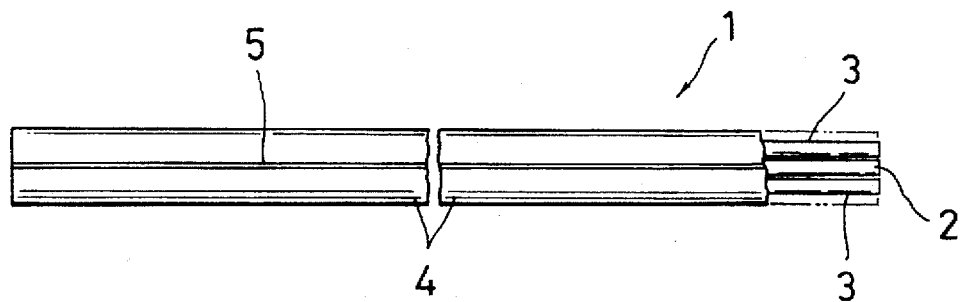
FIG. 1 is a partial cutaway top view showing the first embodiment of the present invention.
Figure 2:
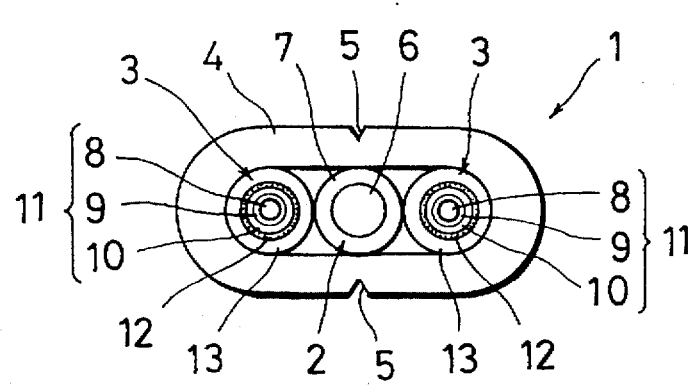
FIG. 2 is an expanded side view showing the first embodiment of the present invention.
Figure 3:
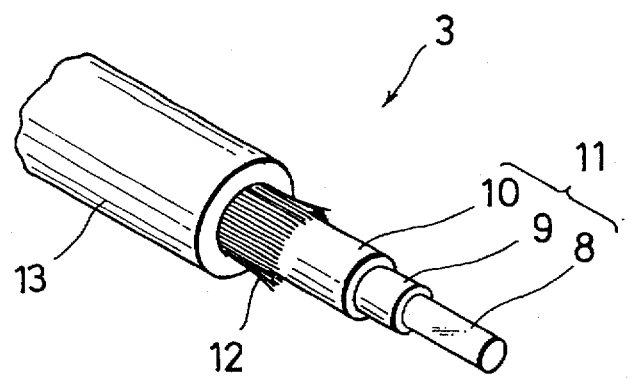
FIG. 3 is an explanation drawing of an optical fiber cord.
Figure 4:
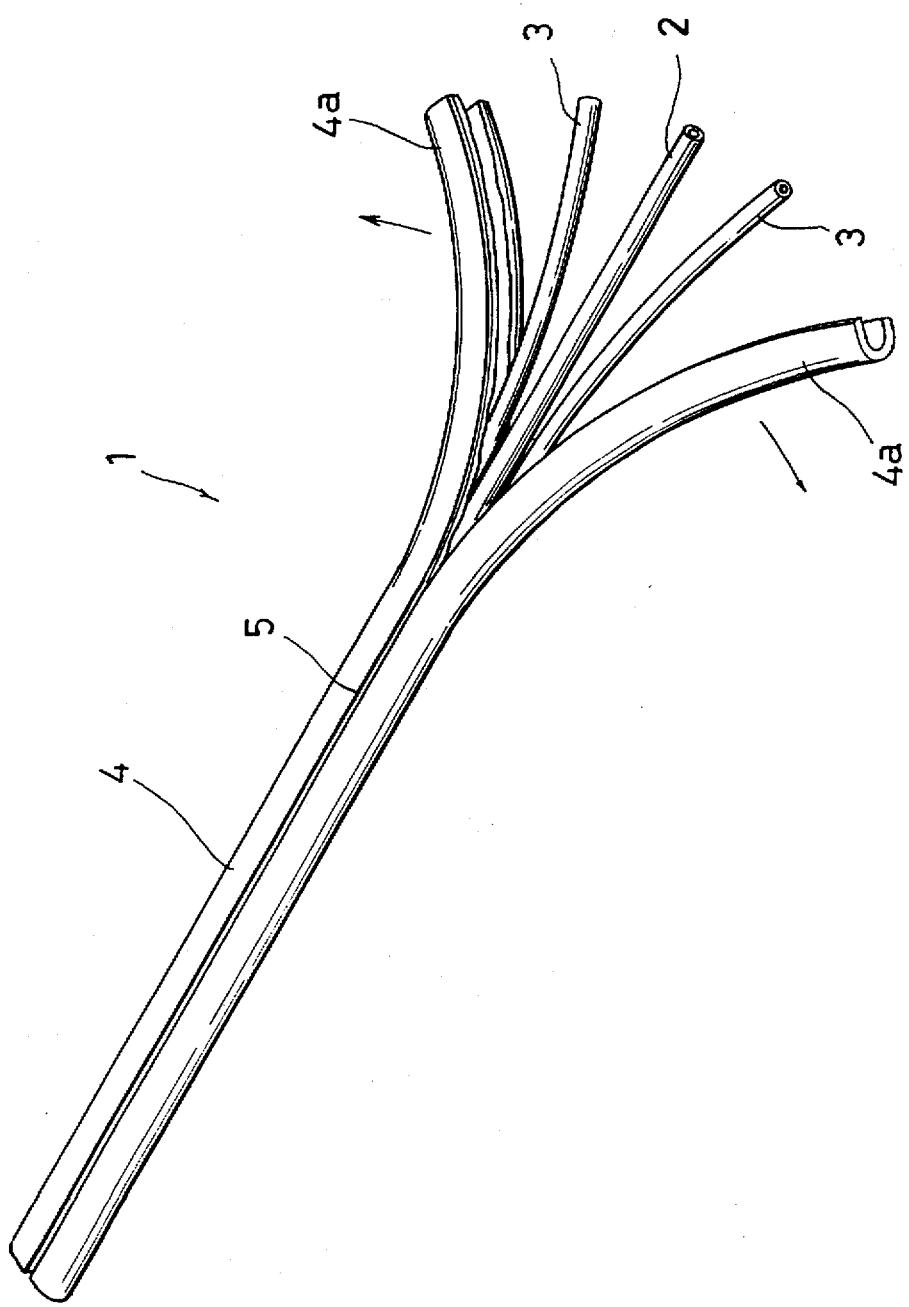
FIG. 4 is an explanation drawing showing the condition which tore a sheath of the first embodiment of the present invention.

Preferred embodiments of the present invention will be described in more details referring to the accompanying drawings.

FIGS. 1 to 4 illustrate the first embodiment of the present invention, a flat optical fiber cable 1 consists of a tension member 2, optical fiber cords 3, 3, a sheath 4, and torn slots 5, 5. Optical fiber cords 3, 3 are arranged so as to paralleled to both sides of tension member 2, and its diameter is the same diameter or a small diameter of a tension member 2. A sheath 4 covers the outside circumferential part of optical fiber code 3, 3 in a row and tension member 2, and it covers so as to become an oval shape. Torn slots 5, 5 are for medby the section that a tension member 2 positions, that is, the upper and lower faces of a nearly central part of a sheath 4.

A tension member 2 is used it in general use. In this embodiment, tension member 2 is used it which covered an outside circumferential part of steel wire 6 with a sheath 7.

Optical fiber core 3 is composed of optical fiber core 11 which covered the outside circumferential part of optical fiber 8 with the inner layer using silicone or ultraviolet curable resin and the outer layer using nylon, ultraviolet curable resin. PVC, or FRP, and a sheath 13, made of thermoplastic resinous material, which covers the outside circumferential part of tensile strength fiber 12 which is attached lengthwise to an optical fiber core 11.

The above-mentioned flat optical fiber cable 1 can take out optical fiber cords 3, 3 easily from inside of the sheath 4a, 4a which was torn on account of pulling in the directions of right and left at end part of sheath 4 and cutting off torn slots 5, 5 at the time of terminal management.

Then, it can be performed without the fact that optical fiber cords 3, 3 are made to damage and power is added.

DIFFERENT PREFERRED EMBODIMENTS OF THE INVENTION

Other embodiments of the present invention will now be described referring to FIGS. 5 to 28. Though the drawings of the embodiments, like components are denoted by like numerals as of the first embodiment and will be explained in more details.

Figure 5:
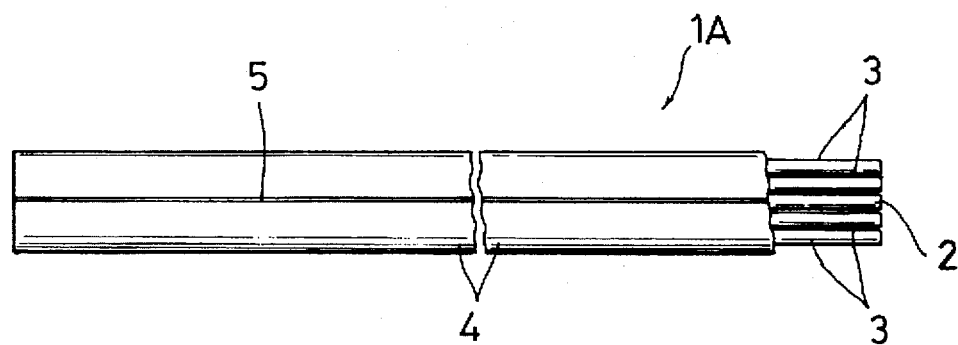
FIG. 5 is a partial cutaway top view showing the second embodiment of the present invention.
Figure 6:
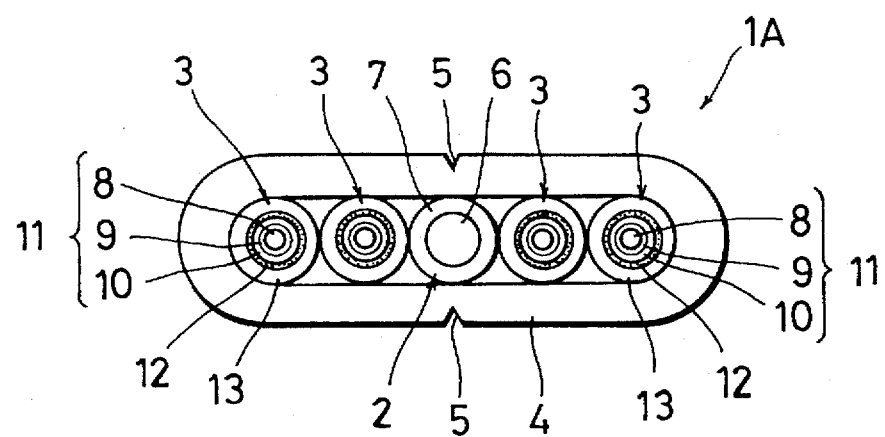
FIG. 6 is an expanded side view showing the second embodiment of the present invention.
Figure 7:
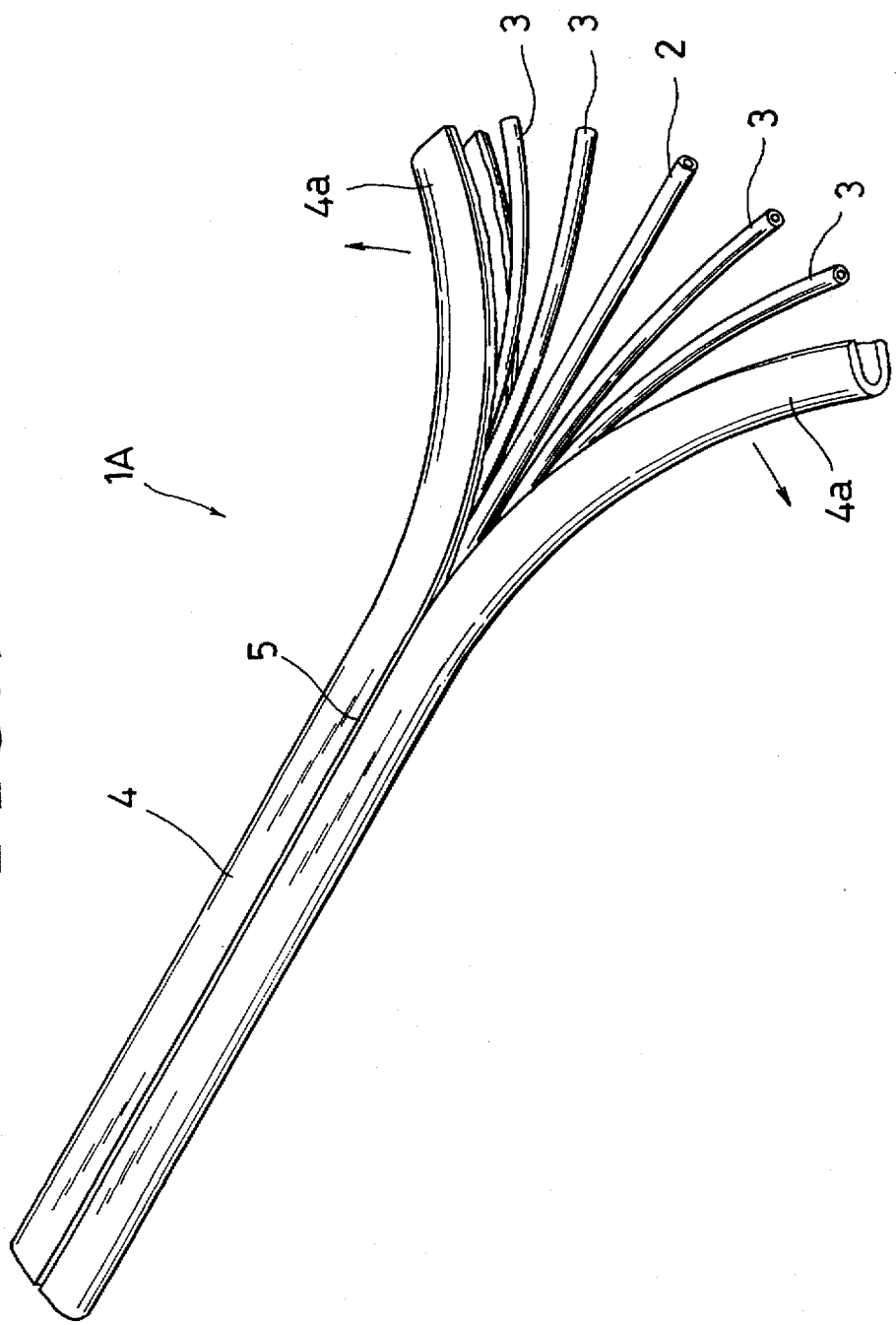
FIG. 7 is an explanation drawing showing the condition which tore a sheath of the second embodiment of the present invention.

FIGS. 5 to 7 show the second embodiment of the present invention which is distinguished from the first embodiment by the fact that two pieces each of optical fiber cords 3, 3, 3, 3 were arranged respectively in a row at both sides of tension member 2. A flat optical fiber cable 1A was formed in this way according to the second embodiment will provide the same effects as the first embodiment.

Figure 8:
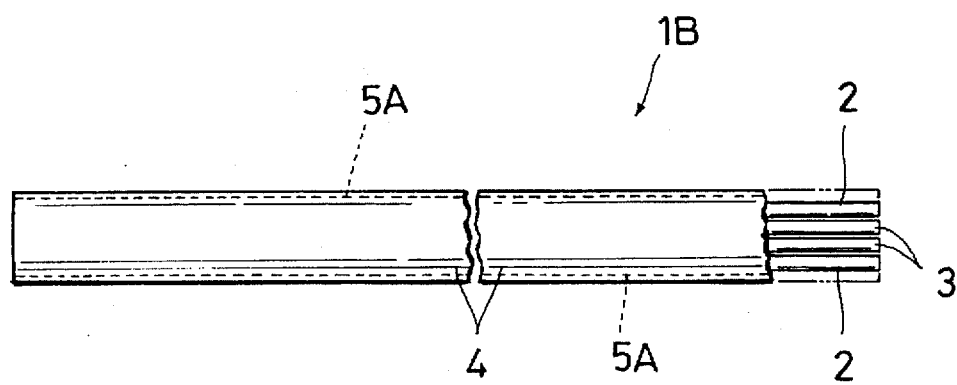
FIG. 8 is a partial cutaway top view showing the third embodiment of the present invention.
Figure 9:
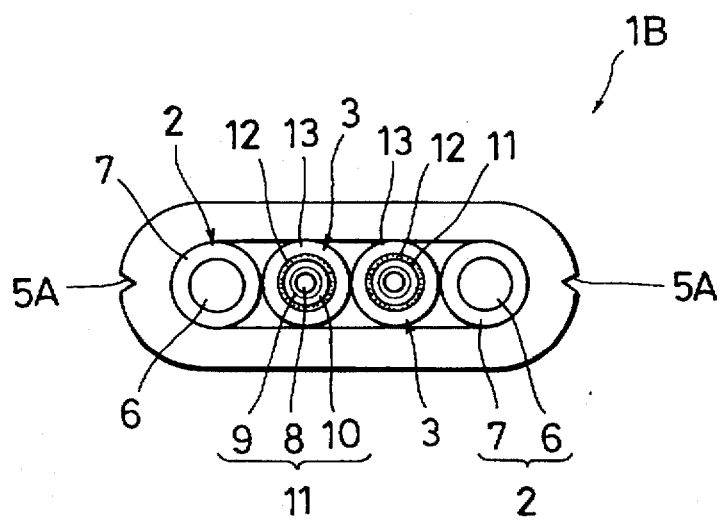
FIG. 9 is an expanded side view showing the third embodiment of the present invention.
Figure 10:
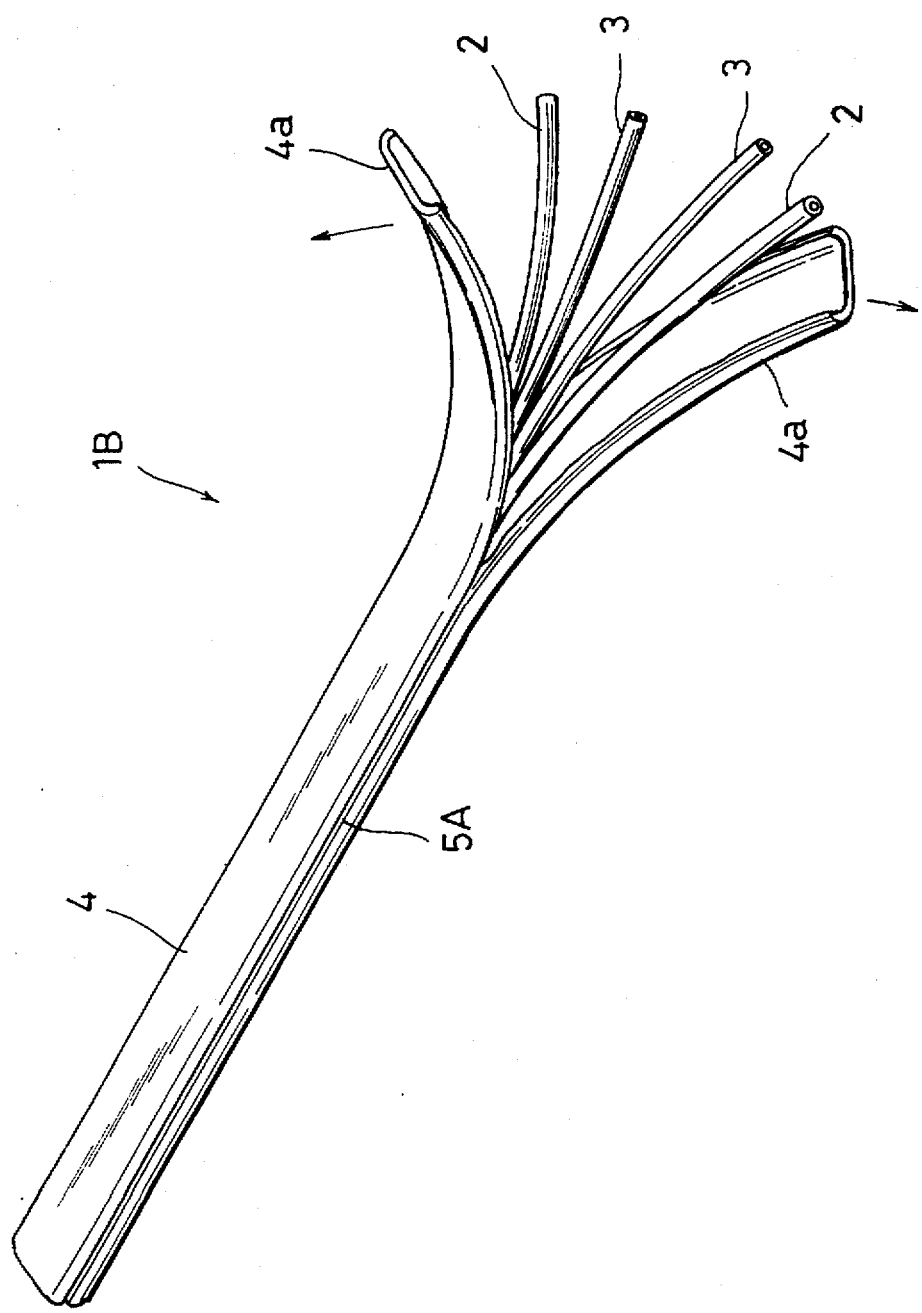
FIG. 10 is an explanation drawing showing the condition which tore a sheath of the third embodiment of the present invention.

FIGS. 8 to 10 show the third embodiment oft he present invention which is distinguished from the first embodiment by the fact that torn slots 5A, 5A are formed in the central part at both sides on a sheath 4 which covers both the outside circumferential parts of optical fiber cords 3, 3 and tension members 2, 2. Then two pieces of optical fiber cords 3, 3 are paralleled and tension members 2, 2 parallel to both side of optical fiber cords 3, 3. A flat optical fiber cable 1B which was formed in this way according to the third embodiment will provide the same effects as the first embodiment.

Figure 11:
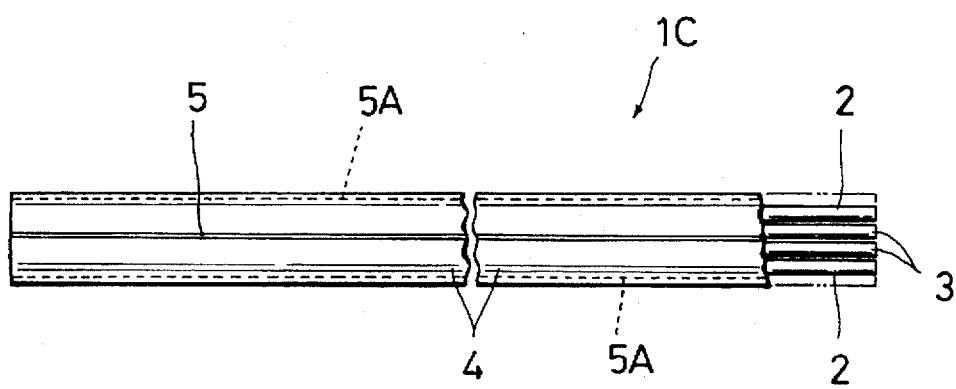
FIG. 11 is a partial cutaway top view showing the fourth embodiment of the present invention.
Figure 12:
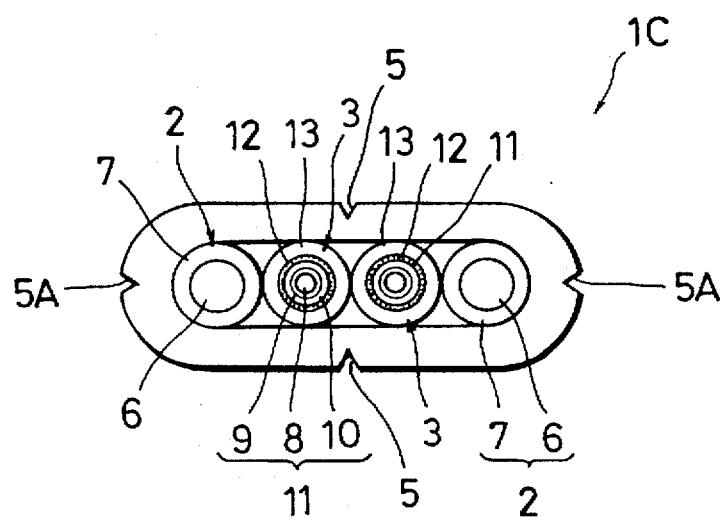
FIG. 12 is an expanded side view showing the fourth embodiment of the present invention.
Figure 13:
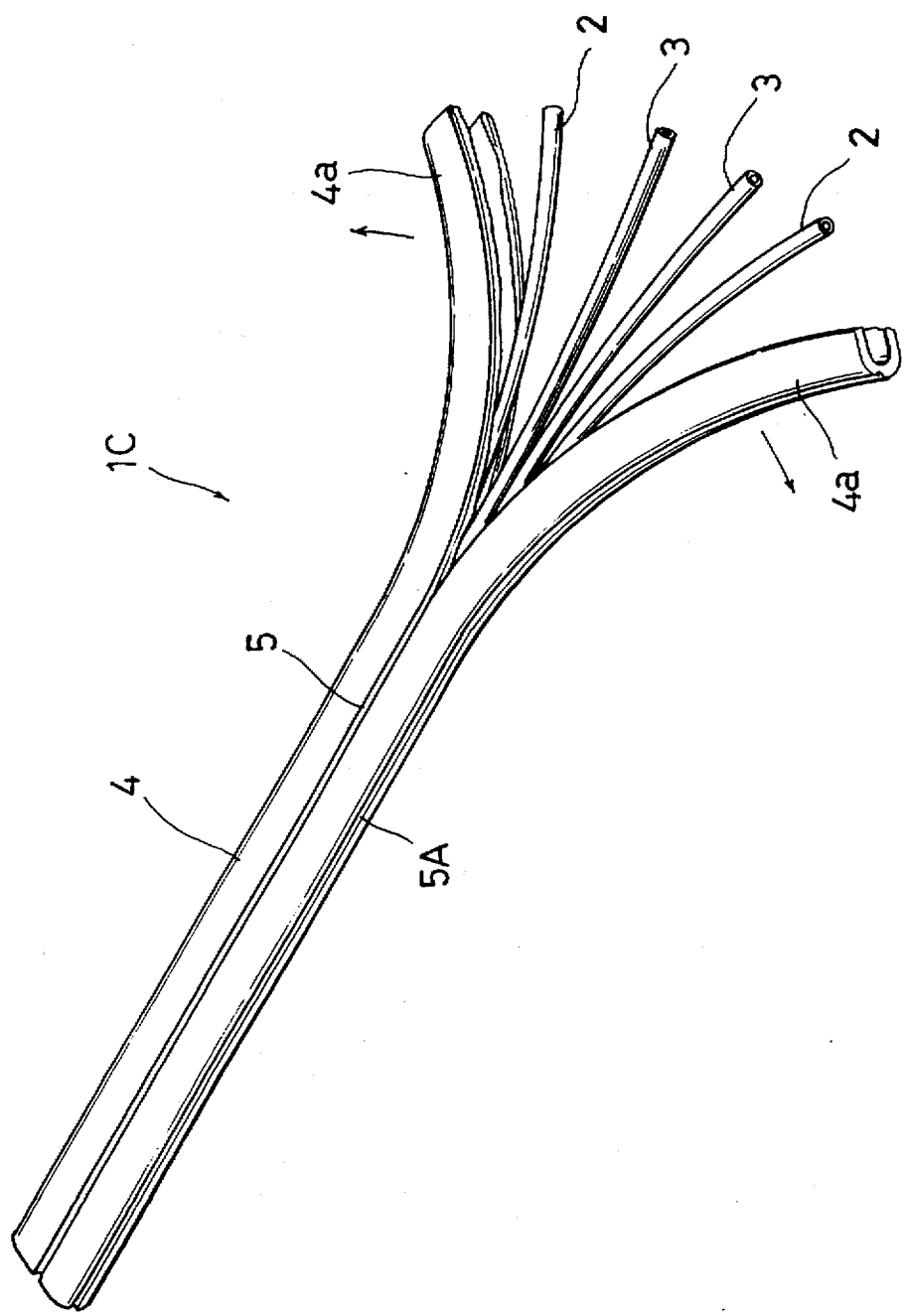
FIG. 13 is an explanation drawing showing the condition which tore a sheath of the fourth embodiment of the present invention.

FIGS. 11 to 13 show the fourth embodiment of the present invention which is distinguished from the third embodiment by the fact that torn slots 5, 5 are formed on a nearly central part of the upper and lower faces of a sheath 4. A flat optical fiber cable 1C with torn slots 5, 5 according to the fourth embodiment will provide the same effects as the third embodiment.

Figure 14:
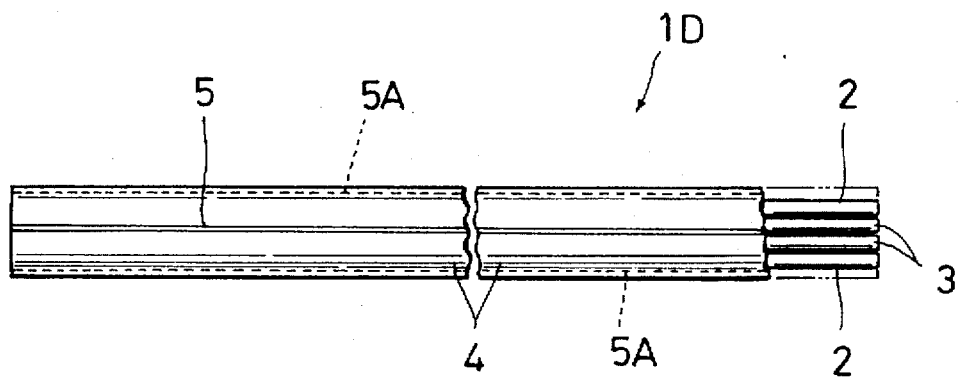
FIG. 14 is a partial cutaway top view showing the fifth embodiment of the present invention.
Figure 15:
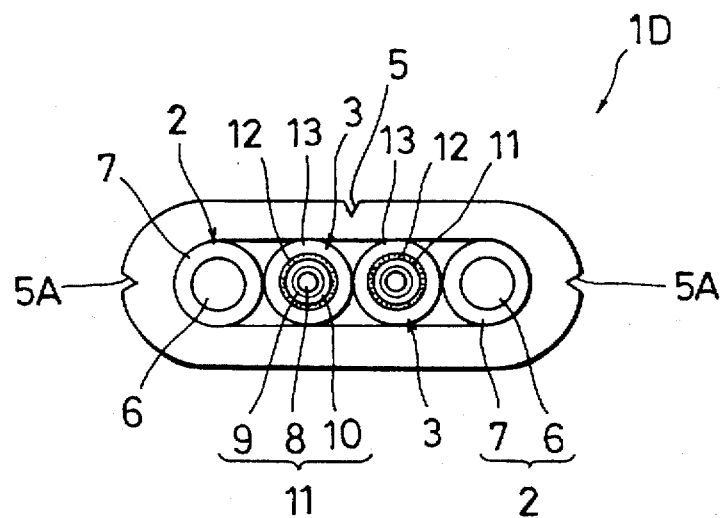
FIG. 15 is an expanded side view showing the fifth embodiment of the present invention.
Figure 16:
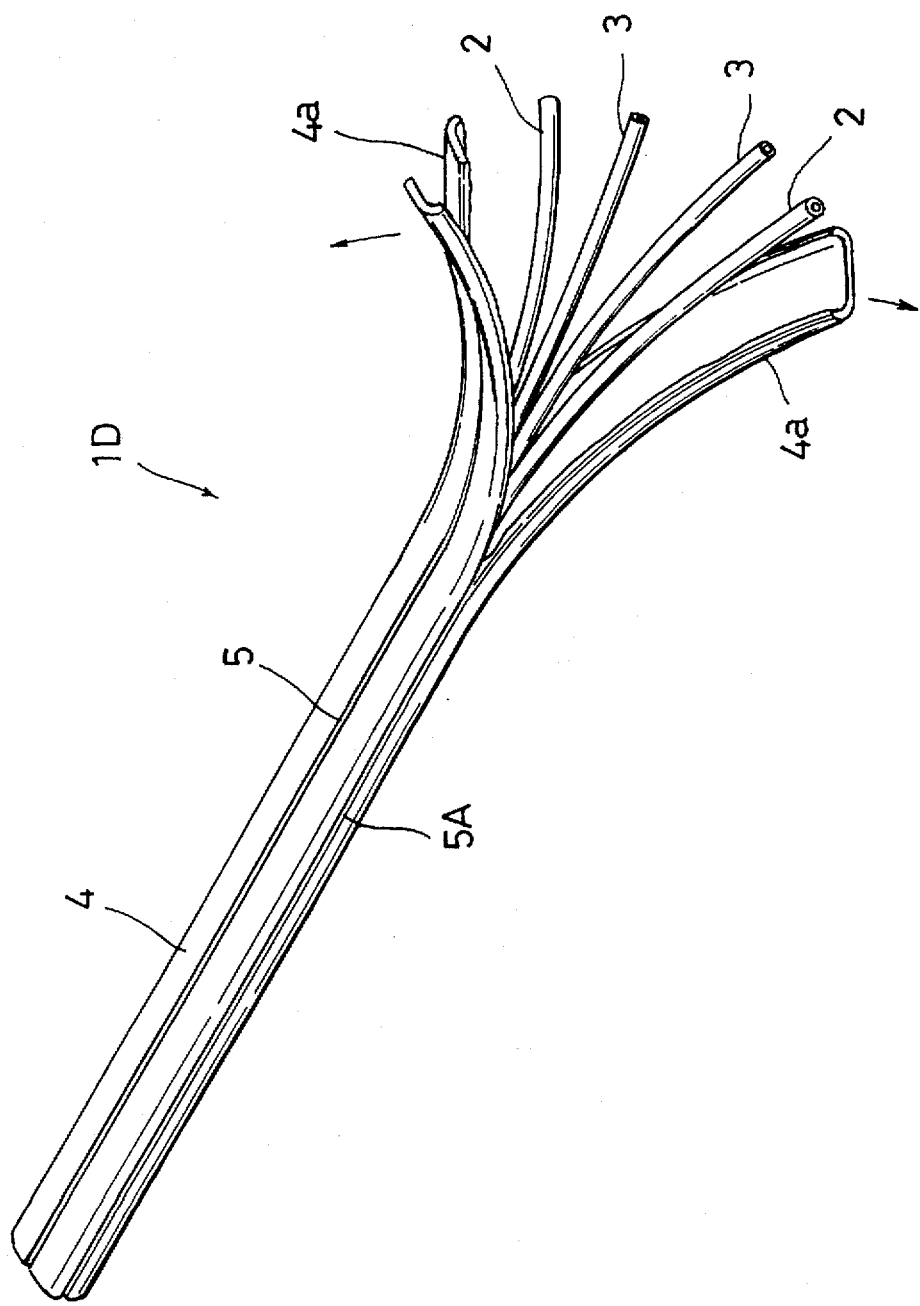
FIG. 16 is an explanation drawing showing the condition which tore a sheath of the fifth embodiment of the present invention.

FIGS. 14 to 16 show the fifth embodiment of the present invention which is distinguished from the third embodiment by the fact that a torn slot 5 is formed on a nearly central part on either the upper or lower face of a sheath 4. A flat optical fiber cable 1D which was formed in this way according to the fifth embodiment will provide the same effects as the third embodiment.

Figure 17:
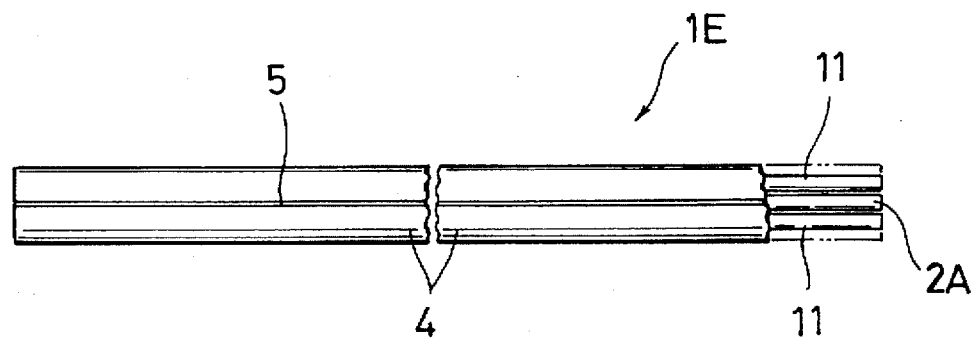
FIG. 17 is a partial cutaway top view showing the sixth embodiment of the present invention.
Figure 18:
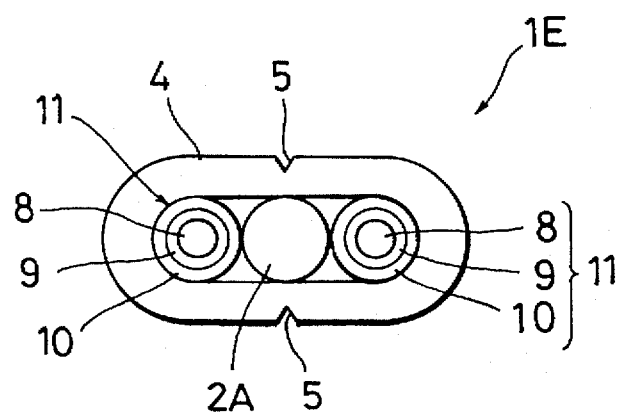
FIG. 18 is an expanded side view showing the sixth embodiment of the present invention.
Figure 19:
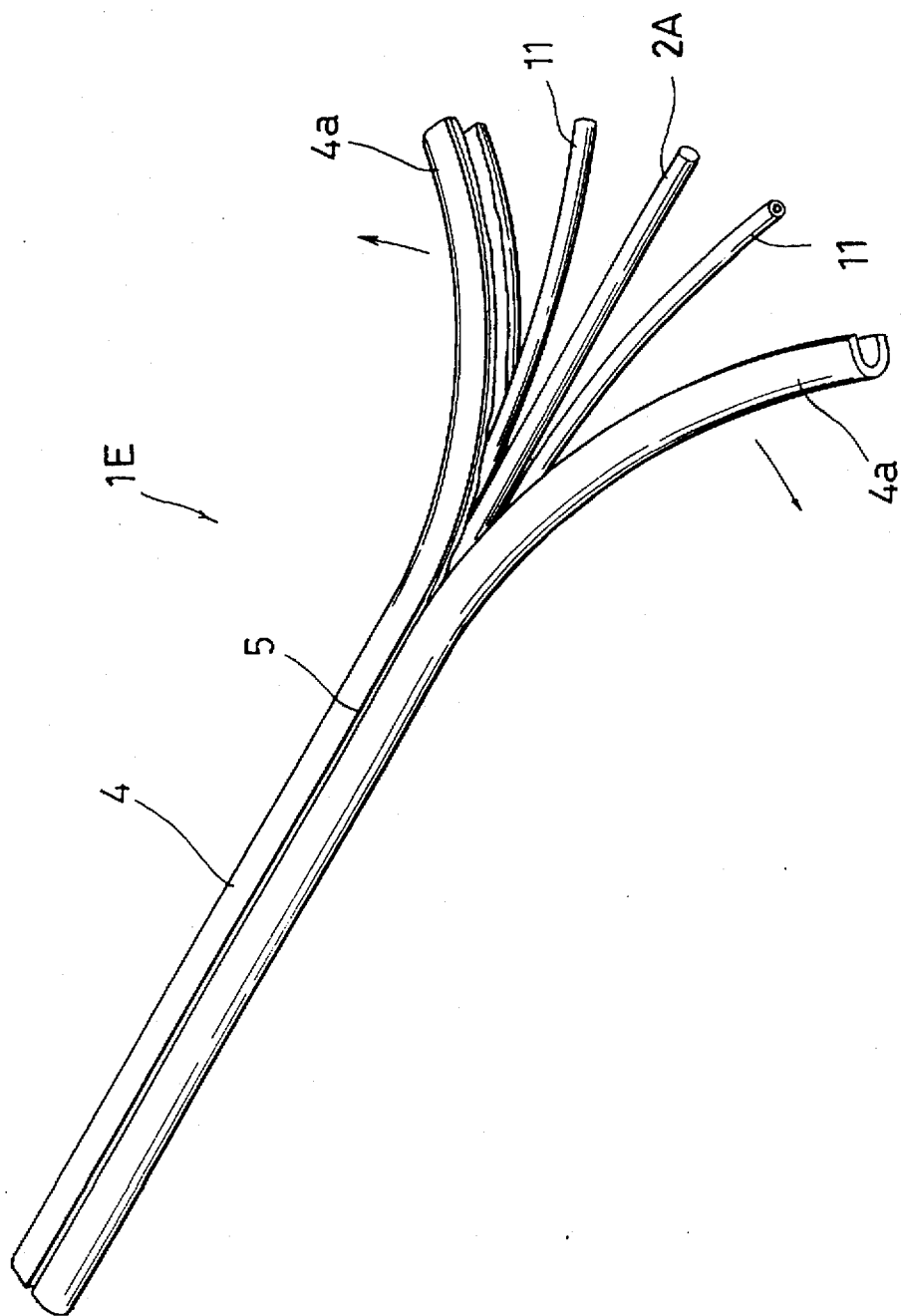
FIG. 19 is an explanation drawing showing the condition which tore a sheath of the sixth embodiment of the present invention.

FIGS. 17 to 19 show the sixth embodiment of the present invention which is distinguished from the first embodiment by the fact that a sheath 4 covers a tension member 2A which was formed by FRP and optical fiber cores 11, 11 as optical fiber which were arranged in a row at both ends of this tension member 2A. A flat optical fiber cable 1E which was formed in this way according to the sixth embodiment will provide the same effects as the first embodiment.

Figure 20:
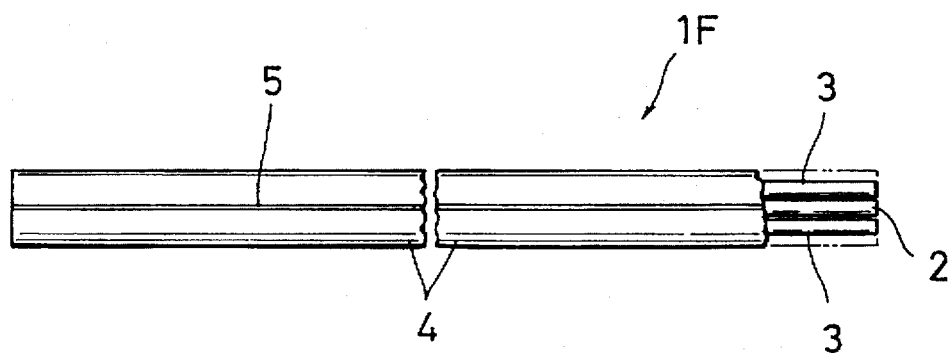
FIG. 20 is partial cutaway top view showing the seventh embodiment of the present invention.
Figure 21:
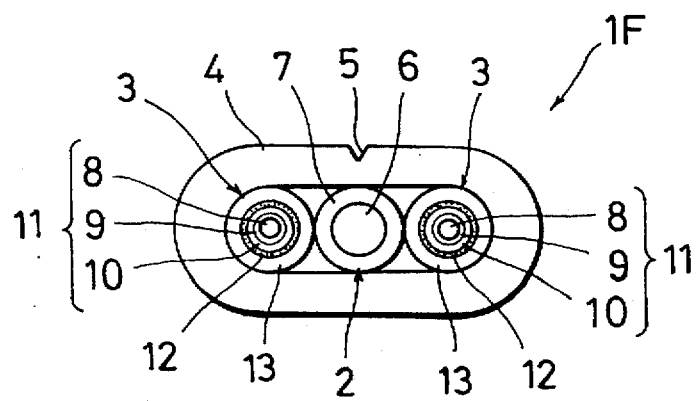
FIG. 21 is an expanded side view showing the seventh embodiment of the present invention.
Figure 22:
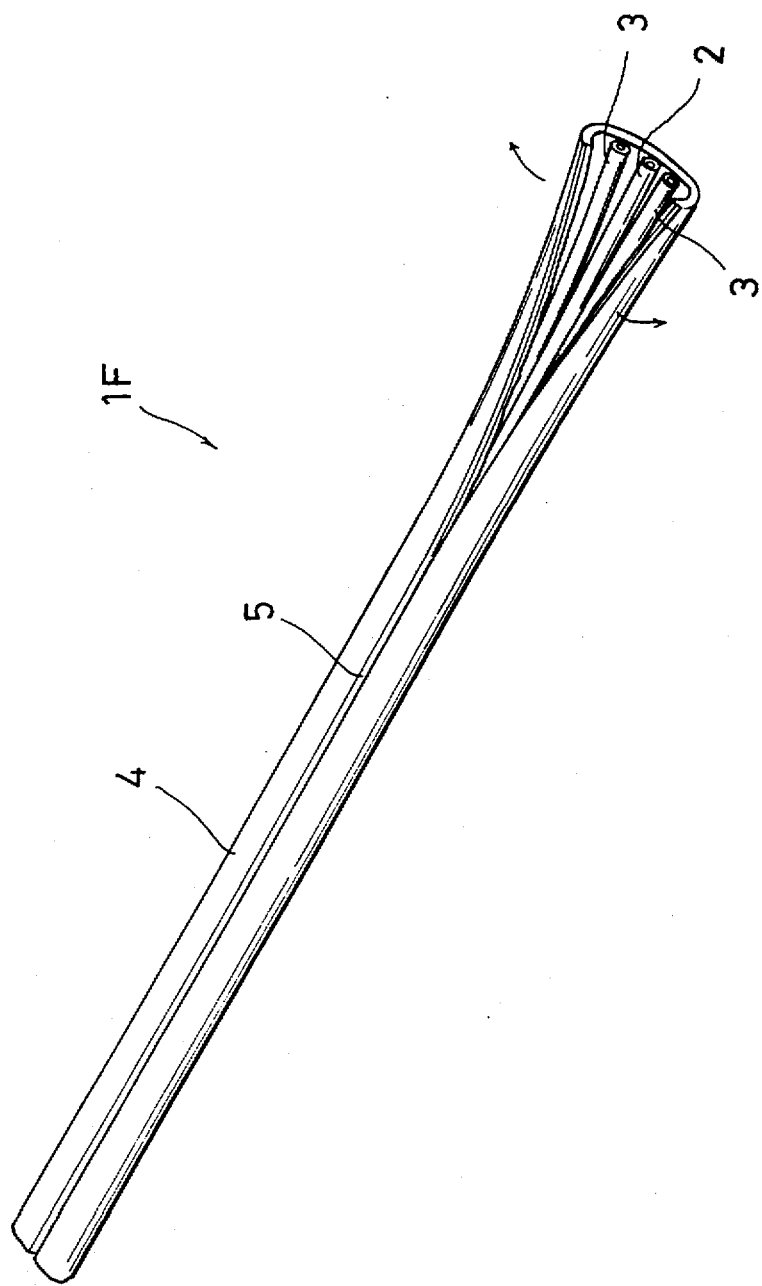
FIG. 22 is an explanation drawing showing the seventh embodiment of the present invention.

FIGS. 20 to 22 show the seventh embodiment of the present invention which is distinguished from the first embodiment by the fact that a torn slot 5 is formed on a nearly central part on either the upper or lower face of a sheath 4. A flat optical fiber cable 1F which was formed in this way according to the seventh embodiment will provide the same effects as the first embodiment.

Figure 23:
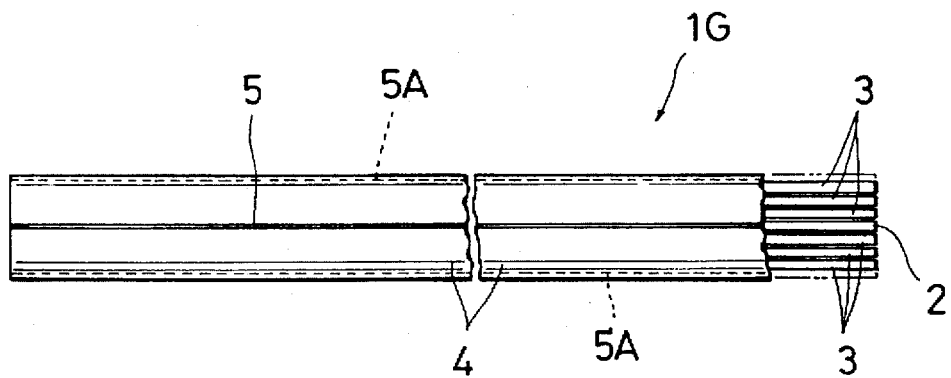
FIG. 23 is a partial cutaway top view showing the eighth embodiment of the present invention.
Figure 24:
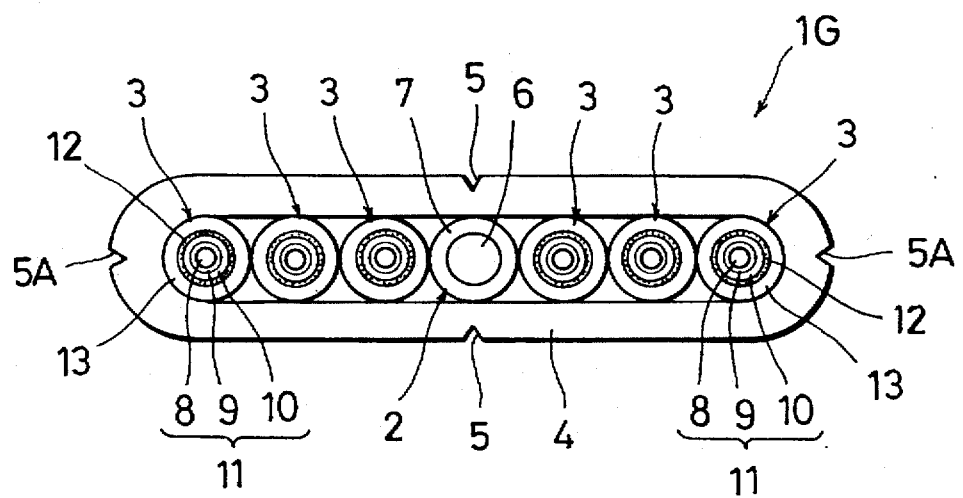
FIG. 24 is an expanded sectional view showing the eighth embodiment of the present invention.
Figure 25:
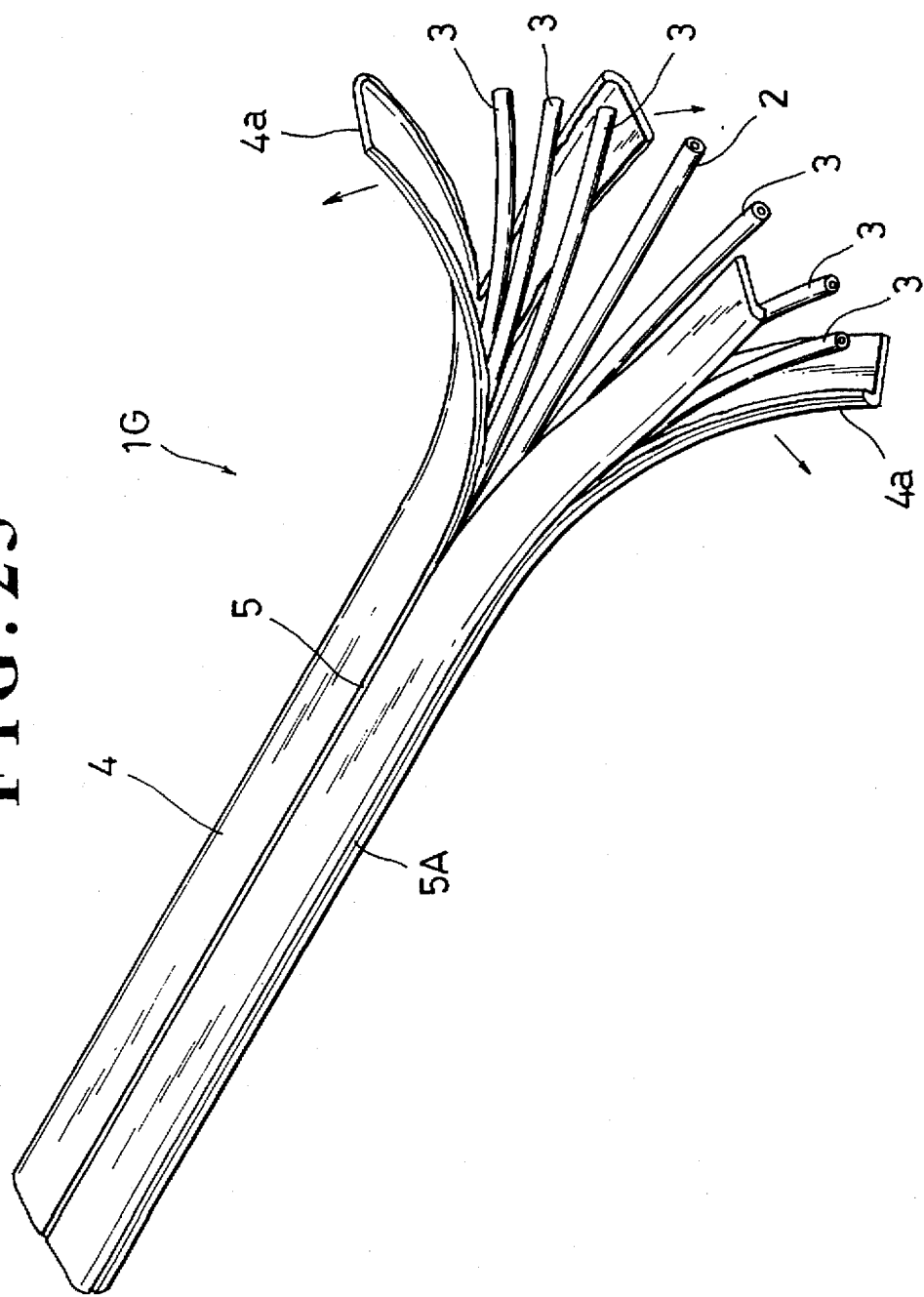
FIG. 25 is an explanation drawing showing the condition which tore a sheath of the eighth embodiment of the present invention.

FIGS. 23 to 25 show the eighth embodiment of the present invention which is distinguished from the first embodiment by the fact that optical fiber cords 3, 3, 3 and 3, 3, 3 which were paralleled three pieces each in a row are arranged at both sides of tension member 2, and torn slots 5, 5, 5A, 5A are formed in a nearly central part at both sides and the upper and lower faces of the sheath 4. A flat optical fiber cable 1G which was formed in this way according to the eighth embodiment will provide the same effects as the first embodiment.

Figure 26:
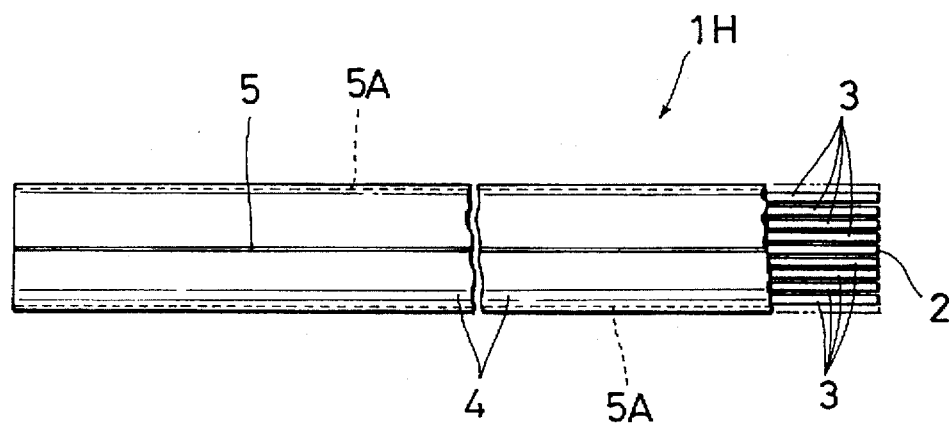
FIG. 26 is a partial cutaway top view showing the ninth embodiment of the present invention.
Figure 27:
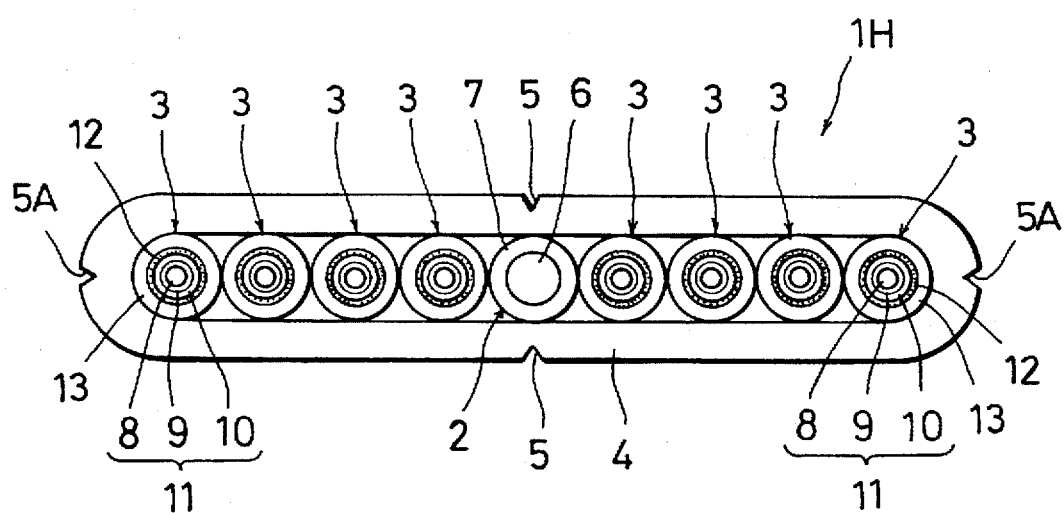
FIG. 27 is an expanded sectional view showing the ninth embodiment of the present invention.
Figure 28:
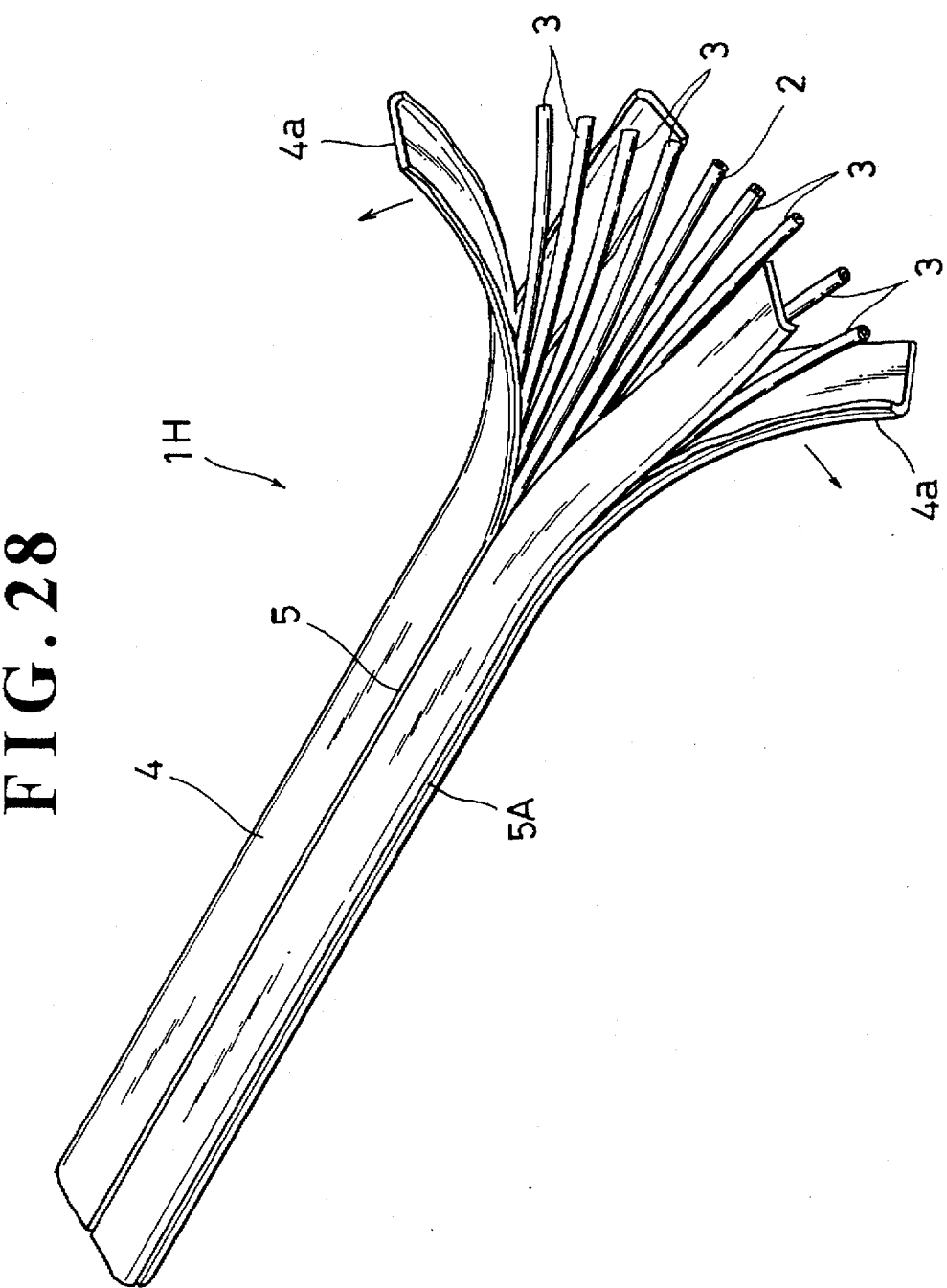
FIG. 28 is an explanation drawing showing the condition which tore a sheath of the ninth embodiment of the present invention.

FIGS. 26 to 28 show the ninth embodiment of the present invention which is distinguished from the first embodiment by the fact that optical fiber cords 3, 3, 3, 3, and 3, 3,3,3 which were paralleled four pieces each in a row are arranged at both sides of tension member 2, and torn slots 5, 5, 5A, 5A are formed in a nearly central part at both sides and the upper and lower faces of a sheath 4. A flat optical fiber cable 1H which was formed in this way according to the ninth embodiment will provide the same effects as the first embodiment.

ADVANTAGES OF THE INVENTION

As set forth above, the advantages of the present invention are as follows:

(1) A optical fiber cable is composed of at least a tension member or more, at least two pieces of optical fibers or more, a sheath, and at least a torn slot or more. At least two pieces of optical fibers or more are arranged the tension member in a row. A sheath covers outside circumferential part of the tension member and optical fibers which were paralleled so as to become a nearly oval shape. At least a torn slot or more is formed at outside circumferential part of the sheath in order that it is easy to take out optical fibers at the time of the terminal management. Therefore, even though a sheath is not cut off by a cutter knife at the time of terminal management as before, it can be cut off by pulling a torn slot to both directions, and it can take out it without the fact that an optical fiber is made to damage and power is added.

(2) As depicted in the above paragraph (1), it can carry out easily because a torn slot has only to be formed on a sheath.

(3) As depicted in the above paragraph (1), it can conduct the terminal transactional operations efficiently because it is easy to cut off the terminal part of a sheath.

What is claimed is:

1. A flat optical fiber cable comprising:

at least two optical fibers a tension strength member for carrying tension on said flat fiber optical cable;

said at least two optical fibers and said tension strength member being disposed adjacent one another in a row to form a flat row assembly with a top surface, a bottom surface and side surfaces at ends of said row;

a tubular sheath covering said flat row assembly;

said tubular sheath having an outside surface and an oval inner surface, the oval inner surface having semicircular portions covering said side surfaces of said flat row assembly and substantially flat top and bottom portions tangentially covering said top and bottom surfaces of said flat row assembly; and at least one tear slot in a formed of a longitudinal indentation in said outside surface of said tubular sheath for permitting said tubular sheath to be torn open along said tear slot and separated from said at least two optical fibers.

2. The flat optical fiber cable according to claim 1, wherein said at least one tear slot includes at least two tear slots formed in substantially central portions of upper and lower surfaces of said outside surface of said tubular sheath.

3. The flat optical fiber cable according to claim 1, wherein said at least one tear slot includes at least two tear slots formed in sides surfaces of said outside surface of said tubular sheath.

4. The flat optical fiber cable according to claim 1, wherein said at least one tear slot is formed in said outside surface of said tubular sheath in a portion of said tubular sheath adjacent to said tension strength member.

5. The flat optical fiber cable according to claim 1, wherein an outside diameter of said tension strength member is equal to or greater than an outside diameter of said at least two optical fibers.

6. A flat optical fiber cable comprising:

at least two optical fibers;

said at least two optical fibers being disposed parallel one another in a row to form a flat row assembly with a top surface, a bottom surface and side surfaces at ends of said row;

a tubular sheath covering said flat row assembly;

said tubular sheath having an outside surface and an oval inner surface, the oval inner surface having semicircular portions covering said side surfaces of said flat row assembly and substantially flat top and bottom portions tangentially covering said top and bottom surfaces of said flat row assembly; and at least one tear slot in the form longitudinal indentation in said outside surface of said tubular sheath for permitting said tubular sheath to be torn open along said tear slot and separated from said at least two optical fibers.

* * * * *